(12) United States Patent
Tsuchida et al.

(10) Patent No.: US 9,505,444 B2
(45) Date of Patent: Nov. 29, 2016

(54) VEHICLE FRONT STRUCTURE

(71) Applicant: Toyota Jidosha Kabushiki Kaisha, Toyota-shi Aichi-ken (JP)

(72) Inventors: Michitaka Tsuchida, Miyoshi (JP); Shunsuke Hayashi, Toyota (JP); Tatsuo Obata, Toyota (JP); Kazuaki Ishiura, Toyota (JP); Takeshi Kuwahara, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/474,992

(22) Filed: Sep. 2, 2014

(65) Prior Publication Data

US 2015/0060179 A1 Mar. 5, 2015

(30) Foreign Application Priority Data

Sep. 4, 2013 (JP) .................................. 2013-183458

(51) Int. Cl.
*B62D 21/15* (2006.01)
*B62D 25/08* (2006.01)

(52) U.S. Cl.
CPC ........... *B62D 25/082* (2013.01); *B62D 21/152* (2013.01); *B62D 21/157* (2013.01)

(58) Field of Classification Search
CPC .. B62D 21/157; B62D 21/15; B62D 21/142; B62D 21/155; B60R 2021/0009; B60R 2021/0025; B60R 2021/0023
USPC .................. 180/232, 312; 296/187.09, 187.1
See application file for complete search history.

(56) References Cited

U.S. PATENT DOCUMENTS

| | | | | |
|---|---|---|---|---|
| 6,298,936 B1 * | 10/2001 | Yoshida | ............... | B60K 5/1216 180/232 |
| 6,957,846 B2 * | 10/2005 | Saeki | .................... | B62D 21/152 180/232 |
| 8,562,068 B2 * | 10/2013 | Yoshida | ............... | B62D 21/152 296/187.03 |
| 8,596,711 B2 * | 12/2013 | Yasui | ..................... | B60R 19/34 296/187.09 |
| 9,061,713 B2 * | 6/2015 | Hashimoto | .......... | B62D 21/152 |
| 2004/0200659 A1 * | 10/2004 | Miyasaka | ............. | B62D 21/155 180/312 |
| 2012/0074732 A1 * | 3/2012 | Yoshida | ............... | B62D 21/152 296/193.07 |
| 2012/0074734 A1 | 3/2012 | Yoshida | | |
| 2012/0248820 A1 | 10/2012 | Yasui et al. | | |
| 2013/0256051 A1 | 10/2013 | Nakamura et al. | | |
| 2014/0159420 A1 * | 6/2014 | Hashimoto | .......... | B62D 21/152 296/187.1 |
| 2015/0329144 A1 * | 11/2015 | Hara | .................... | B62D 21/152 296/187.09 |

FOREIGN PATENT DOCUMENTS

| | | |
|---|---|---|
| JP | 09-216575 A | 8/1997 |
| JP | 2003-220977 A | 8/2003 |
| JP | 2003-226266 A | 8/2003 |
| JP | 2007-099136 A | 4/2007 |

(Continued)

*Primary Examiner* — Ruth Ilan
(74) *Attorney, Agent, or Firm* — Dinsmore & Shohl LLP

(57) ABSTRACT

A vehicle front structure includes: a power unit provided on a front part of a vehicle; a front side member which is arranged outside the power unit in a vehicle width direction and which extends in a vehicle longitudinal direction; and a load receiving portion which is provided on a side portion on a front side member side of the power unit and which is located inside the front side member in a vehicle width direction while stiffness thereof in the vehicle width direction is higher than other location of the side portion.

4 Claims, 4 Drawing Sheets

(56) References Cited

FOREIGN PATENT DOCUMENTS

| JP | 2010-184674 A | 8/2010 |
| JP | 2012-214211 A | 11/2012 |
| JP | 2013-212757 A | 10/2013 |
| WO | 2011108078 A1 | 9/2011 |
| WO | 2011108079 A1 | 9/2011 |
| WO | WO 2014042041 A1 * | 3/2014 | ........... B62D 21/152 |
| WO | WO 20140192176 A1 * | 12/2014 | ........... B62D 21/152 |

* cited by examiner

VEHICLE FRONT STRUCTURE

INCORPORATION BY REFERENCE

The disclosure of Japanese Patent Application No. 2013-183458 filed on Sep. 4, 2013 including the specification, drawings and abstract is incorporated herein by reference in its entirety.

BACKGROUND OF THE INVENTION

1. Field of the Invention

The present invention relates to a vehicle front structure.

2. Description of Related Art

There has been known a vehicle shock absorbing structure which includes a pair of front side members, a power unit (engine unit) arranged between the pair of the front side members and a reinforcement member for reinforcing side faces inside the front side members in the vehicle width direction (see Japanese Patent Application Publication No. 2003-220977 (JP 2003-220977 A), for example.)

By the way, offset collision (hereinafter, this collision type is called "small lap collision") in which a colliding body collides with an outside part with respect to the front side member in the vehicle width direction in a vehicle longitudinal direction has been known.

As a countermeasure for such a small lap collision, it can be considered to bend the front side member inward in the vehicle width direction to press the side portion of the power unit inward in the vehicle width direction by means of a bending portion which has been bent and slide a vehicle front part in a direction away from the colliding body (lateral direction).

However, this power unit has a room for improvement in generating a lateral load which slides the vehicle front part in the direction away from the colliding body when a small lap collision occurs.

SUMMARY OF THE INVENTION

The present invention provides a vehicle front structure capable of increasing a lateral load which slides a vehicle front part in a direction away from a colliding body at the time of small lap collision.

A first aspect of the present invention relates to a vehicle front structure. The vehicle front structure includes a power unit provided on the front part of the vehicle; a front side member which is arranged outside the power unit in a vehicle width direction and which extends in a vehicle longitudinal direction; and a load receiving portion which is provided on a side portion on a front side member side of the power unit and which is located inside the front side member in the vehicle width direction while the stiffness thereof in the vehicle width direction is higher than other location of the side portion.

According to the above-described aspect, the load receiving portion located inside the front side member in the vehicle width direction is provided on the side portion on the front side member side of the power unit.

Here, for example, when the front side member is bent inward in the vehicle width direction at the time of small lap collision, the bending portion of the front side member makes contact with the side portion of the power unit. At this time, the side portion of the power unit undergoes crush-deformation or the like, so that reaction force obtained from the power unit decreases. That is, the lateral load which slides the vehicle front part in a direction away from the colliding body decreases.

According to the first aspect of the present invention, as a countermeasure for this phenomenon, the load receiving portion whose stiffness in the vehicle width direction is set higher than other portions is provided on the side portion of the power unit. When the bending portion of the front side member is received by the load receiving portion, crush-deformation or the like of the side portion of the power unit is suppressed. Thus, as compared to a case where the bending portion of the front side member comes into contact with other portions (portions other than the load receiving portion) on the side portion of the power unit, reaction force obtained from the power unit increases.

According to the first aspect of the present invention, the lateral load which slides the vehicle front part in the direction away from the colliding body can be increased at the time of the small lap collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a plan view showing a vehicle front part which a vehicle front structure according to a first embodiment of the present invention is applied to;

FIG. 3 is an enlarged sectional view corresponding to FIG. 2 showing a transaxle unit which a vehicle front structure according to a second embodiment of the present invention is applied to; and FIG. 4 is an enlarged sectional view corresponding to FIG. 3 showing a transaxle unit which a modification of the vehicle front structure according to the second embodiment of the present invention is applied to.

DETAILED DESCRIPTION OF EMBODIMENTS

Hereinafter, a vehicle front structure according to an embodiment of the present invention will be described with reference to the drawings. In the meantime, an arrow UP in each drawing indicates upward in the up and down direction of the vehicle, an arrow FR indicates forward in the vehicle longitudinal direction and an arrow OUT indicates outward in the vehicle width direction (leftward of the vehicle).

Now, a first embodiment will be described.

Figure 1:
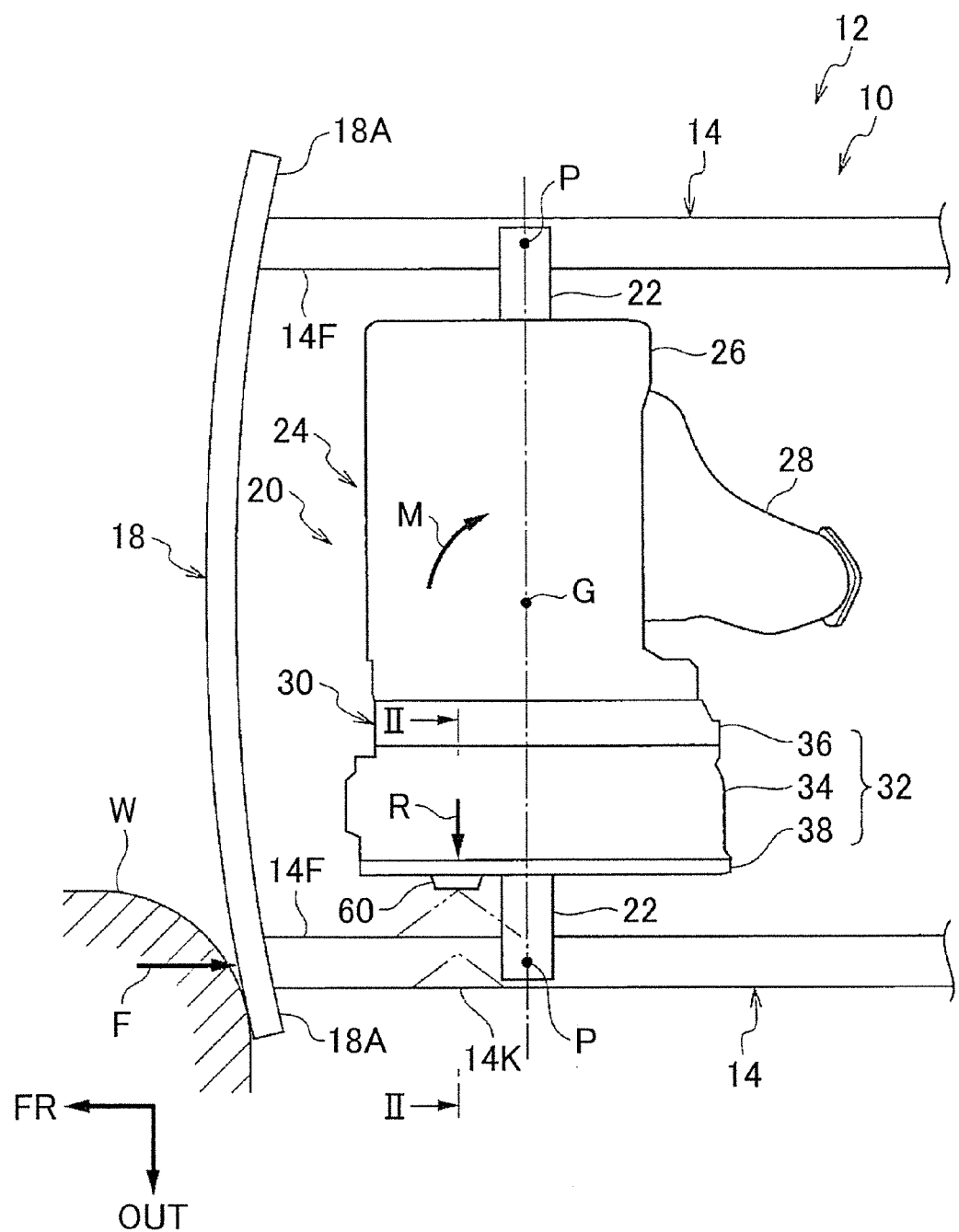

FIG. 1 shows a vehicle front part 12 of a vehicle to which a vehicle front structure 10 according to the first embodiment has been applied. It is assumed that this vehicle is a so-called hybrid vehicle provided with two kinds of power sources.

The vehicle front structure 10 includes a pair of front side members 14 arranged on both sides of the vehicle front part 12, a front bumper reinforcement 18 arranged on a front end side of the vehicle front part 12, and a power unit 20 arranged between the pair of the front side members 14. In the meantime, a cabin (passenger compartment) not shown in the figure is formed in the back of the power unit 20 in the vehicle longitudinal direction across a dash panel.

The pair of the front side members 14 is a framework member which constitutes a framework of a side portion of the vehicle front part 12 and are arranged at both sides of the power unit 20 in the vehicle width direction. Each of the front side members 14 extends in the longitudinal direction of the vehicle and its sectional shape as viewed with respect to the vehicle longitudinal direction is assumed to be a closed section. In the meantime, a front end portion 14F of the front side member 14 in the vehicle longitudinal direction may be provided with a cylindrical crush box which undergoes axial compressive deformation at the time of front collision to absorb collision energy.

The front bumper reinforcement (hereinafter also referred to as just "bumper reinforcement") 18 is arranged at a front side of the power unit 20 in the vehicle longitudinal direction. The bumper reinforcement 18 extends in the vehicle width direction and the sectional shape as viewed in the vehicle width direction is assumed to be a closed section. The front end portions 14F of the pair of the front side members 14 are connected to both sides of the bumper reinforcement 18 in the vehicle width direction respectively. Both-end portions 18A of the bumper reinforcement 18 in the vehicle width direction extend outward in the vehicle width direction from the pair of the front side members 14.

Further, a bending portion 14K which is to be bent inward in the vehicle width direction when a collision load F in the vehicle longitudinal direction is input is provided on one side (left side) of the front side members 14. This bending portion 14K is provided with a fragile part (not shown) which acts as a starting point for, for example when the collision load F is input, bending the bending portion 14K inward in the vehicle width direction, a reinforcement member which supplies the bending portion 14K with a difference in stiffness so that the bending portion 14K is bent inward in the vehicle width direction and the like. In the meantime, as the fragile part, for example, a cutout, a concave portion, a longitudinal bead extending in a vehicle up and down direction and the like can be mentioned. Further, as the reinforcement member, for example, a reinforcement rib, a bulk head and the like can be mentioned.

The power unit 20 includes an engine unit 24 and a transaxle unit 30. The power unit 20 is arranged between the pair of the front side members 14 and side portions thereof on both sides in the vehicle width direction are supported by the front side members 14 via each mount bracket 22. In the meantime, in the present embodiment, a gravity center G of the power unit 20 is located near a middle part between supporting points P of the mount brackets 22 with respect to the pair of the front side members 14 when viewing from a vehicle upper side. Further, the mount bracket 22 is arranged backward with respect to the bending portion 14K of the front side member 14 in the vehicle longitudinal direction.

The engine unit 24 has an engine case 26 and an exhaust manifold 28 and is arranged on the other front side member 14 side (right side). An engine (not shown) which serves as an internal combustion engine, a crank shaft (output shaft, not shown) configured to convert an engine piston action to a rotary motion and the like are accommodated inside the engine case 26. The exhaust manifold 28 is connected to the engine. An exhaust pipe (not shown) which extends backward of the vehicle is connected to the exhaust manifold 28, so that exhaust gas which is discharged out of the engine is emitted backward of the vehicle via the exhaust pipe.

The transaxle unit 30 is connected to a side portion of the engine unit 24 so that it can transmit engine power. The transaxle unit 30 is arranged on the front side member 14 side (left side) which is one side with respect to the engine unit 24 so as to be in parallel with the engine unit in the vehicle width direction.

The transaxle unit 30 which serves as a transmission unit contains a transaxle case 32. The transaxle case 32 includes a main body case 34, an engine-side case 36 arranged on the engine unit 24 side with respect to the main body case 34 and a side case (side-face case) 38 arranged on an opposite side to the engine unit 24 with respect to the main body case 34.

Figure 2:
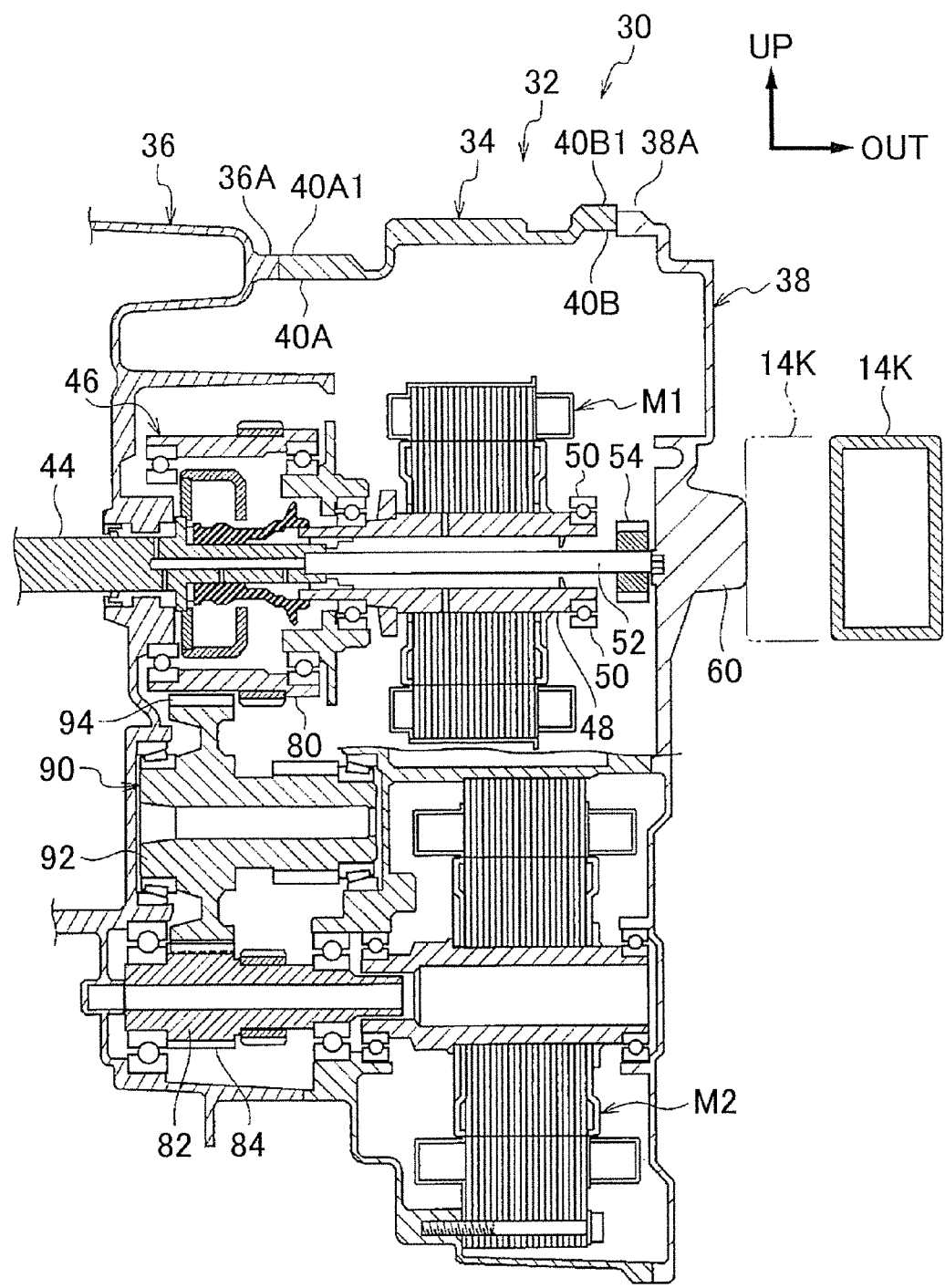
FIG. 2 is an enlarged sectional view of a transaxle unit cut out along the line II-II in FIG. 1.

As shown in FIG. 2, the main body case 34 has opening portions 40A, 40B on both sides thereof in the vehicle width direction. An opening edge portion 40A1 of the opening portion 40A located on the engine unit 24 (see FIG. 1) side is fixed such that it is abutted against an opening edge portion 36A of the engine-side case 36. Further, a flange portion 40B1 is provided on the opening edge portion of the opening portion 40B located on an opposite side to the engine unit 24. A flange portion 38A formed on an external peripheral portion of the side case 38 is fixed such that it is abutted against the flange portion 40B1 with bolts or the like (not shown). The side case 38 forms a side wall portion of the transaxle unit 30.

Further, the transaxle unit 30 includes an input shaft 44, an output dividing mechanism 46, a first motor generator M1, a second motor generator M2, and a counter-gear mechanism 90. In the meantime, FIG. 2 is a sectional view showing a hollow shaft 48 of the first motor generator M1, an output shaft 82 of the second motor generator M2 and a counter shaft 92 of the counter gear mechanism 90 on the same plane.

The input shaft 44 extends in the vehicle width direction and is supported rotatably via a bearing (not shown) located on the engine unit 24 side of the transaxle case 32. A crank shaft of the engine unit 24 is connected to the input shaft 44 via a damper mechanism or the like (not shown) which absorbs torque fluctuation.

The output dividing mechanism 46 is provided on the input shaft 44 and has a drive gear 80 and the like configured to transmit engine output to the counter gear mechanism 90. The output dividing mechanism 46 is constructed so as to be capable of dividing engine output which is input from the crank shaft to the input shaft 44 to the first motor generator M1 and the counter gear mechanism 90.

The first motor generator M1 and the second generator M2 function as an electric motor (motor) and a generator respectively. In the meantime, the first motor generator M1 and the second motor generator M2 may be constructed to have at least one function of the electric motor and the generator. The first motor generator M1 has the hollow shaft 48 which serves as an output shaft. The hollow shaft 48 extends in the vehicle width direction, and is arranged substantially coaxially with the input shaft 44 and supported rotatably by the main body case 34 via a bearing 50. In the meantime, the hollow shaft 48 is arranged at a position apart from the side case 38.

The second motor generator M2 has the output shaft 82 which is substantially parallel to the hollow shaft 48. The output shaft 82 is provided with a drive gear 84 for transmitting an output of the second motor generator M2 to the counter gear mechanism 90. The counter gear mechanism 90 includes the counter shaft 92 which is substantially parallel to the output shaft 82 of the second motor generator M2, a driven gear 94 provided on the counter shaft 92 and the like. The counter gear mechanism 90 is constructed to transmit engine output transmitted from the output dividing mechanism 46 and output of the second motor generator M2 transmitted from the drive gear 84 to drive wheels via gear train, a drive shaft (not shown) and the like.

Here, an oil pump shaft 52 which supplies oil to the output dividing mechanism 46 and the like is arranged inside the hollow shaft 48 of the first motor generator M1. The oil pump shaft 52 is formed cylindrically and contains an internal passage in which oil flows inside therein. The oil pump shaft 52 is arranged substantially coaxially with the hollow shaft 48 and one end thereof is supported by the input shaft 44 while the other end is supported by a projecting portion 60 of the side case 38 described below. An oil pump gear 54 is provided on the other end side of the oil pump shaft 52. Oil is supplied from the oil pump gear 54 to the output dividing mechanism 46 and the like via the internal passage of the oil pump shaft 52.

Further, the projecting portion 60 which projects outward in the vehicle width direction is provided at a location opposed to the bending portion 14K of the front side member 14 on the side case 38. The projecting portion 60 which serves as a load receiving portion is thicker than other portions of the side case 38. As a result, the stiffness of the projecting portion 60 in the vehicle width direction is higher than other portions of the side case 38.

The oil pump shaft 52 and the input shaft 44 which serve as a shaft portion are arranged inside the projecting portion 60 in the vehicle width direction. That is, the transaxle unit 30 which serves as a transmission unit has a shaft portion extending in the vehicle width direction. The shaft portion is arranged inside the main body case 34. The oil pump shaft 52 and the input shaft 44 are arranged coaxially and support the projecting portion 60 from inside in the vehicle width direction. That is, the projecting portion 60 is arranged on the axis of the oil pump shaft 52 and the input shaft 44. As shown in FIG. 1, the projecting portion 60 is positioned forward with respect to the gravity center G of the transaxle unit 30 in the vehicle longitudinal direction.

Next, an operation of the first embodiment will be described.

As shown in FIG. 1, the power unit 20 is arranged between the pair of the front side members 14. The power unit 20 has the engine unit 24 and the transaxle unit 30 which are arranged in parallel to each other in the vehicle width direction. The transaxle unit 30 is arranged on one of the front side member 14 sides (left side) thereof. The transaxle unit 30 contains the engine-side case 36, the main body case 34 and the side case 38, which are arranged in order from the engine unit 24 side.

Then, if a colliding body W collides with one of the front side members 14 at the time of the small lap collision, for example, as indicated by a two-dot chain line, the bending portion 14K of the front side member 14 is bent inward in the vehicle width direction so that it comes into contact with the side case 38 of the transaxle unit 30.

Here, because the side case 38 is a member which closes the opening portion 40B of the main body case 34, the stiffness in the vehicle width direction is more likely to drop than the main body case 34. Thus, if the bending portion 14K of the front side member 14 comes into contact with the side case 38, the side case 38 may undergo crush-deformation or the like. If the side case 38 undergoes crush-deformation or the like in this way, reaction force R obtained from the power unit 20 decreases. That is, a lateral load which slides the vehicle front part 12 in a direction away from the colliding body W decreases.

In the present embodiment, as a countermeasure for this, the transaxle unit 30 is provided with the projecting portion 60. The projecting portion 60 projects outward in the vehicle width direction from a portion opposed to the bending portion 14K of the side case 38 and the stiffness in the vehicle width direction is higher than other portions of the side case 38. The bending portion 14K of the front side member 14 is received by the projecting portion 60. As a result, the bending portion 14K of the front side member 14 becomes easy to make contact with the projecting portion 60 and as compared to a case where the bending portion 14K of the front side member 14 makes contact with other portions of the side case 38, crush-deformation or the like of the side case 38 is suppressed. That is, the lateral load which slides the vehicle front part in a direction away from the colliding body can be increased.

Further, the projecting portion 60 is arranged on the axis of the oil pump shaft 52 and the input shaft 44 which extend in the vehicle width direction. Because the projecting portion 60 is supported from inward in the vehicle width direction by the oil pump shaft 52 and the input shaft 44, if the bending portion 14K of the bent front side member 14 makes contact with the projecting portion 60 at the time of small lap collision, the crush-deformation or the like of the projecting portion 60 is further suppressed. In other words, a collision load transmitted to the projecting portion 60 is transmitted dispersively to the main body case 34, the engine-side case 36 and the engine unit 24 via the oil pump shaft 52 and the input shaft 44. Therefore, the crush-deformation or the like of the side case 38 is further suppressed.

By suppressing the crush-deformation of the side case 38 in this way, the reaction force R obtained from the power unit 20 at the time of small lap collision increases. That is, the lateral load which slides the vehicle front part 12 in the direction away from the colliding body W at the time of small lap collision increases thereby suppressing a damage or the like of the side case 38 effectively. Thus, the deformation or the like of a cabin (not shown) formed backward of the power unit 20 in the vehicle longitudinal direction is suppressed thereby improving collision resistance against the small lap collision.

In addition, by using the oil pump shaft 52 and the input shaft 44, the stiffness of the projecting portion 60 in the vehicle width direction can be intensified without adding any new member. Thus, the lateral load which slides the vehicle front part in the direction away from the colliding body can be increased while suppressing increase in the number of components.

Further, the projecting portion 60 is located forward with respect to the gravity center G of the power unit 20 in the vehicle longitudinal direction. As a result, when the bending portion 14K of the front side member 14 makes contact with the projecting portion 60, a moment M is generated in the power unit 20. The power unit 20 is turned by the moment M so that the power unit 20 becomes easy to move inward in the vehicle width direction. Thus, damage or the like of the side case 38 can be suppressed.

Next, a second embodiment will be described. In the meantime, like reference numerals are attached to the same components as the first embodiment and description thereof is omitted.

Figure 3:
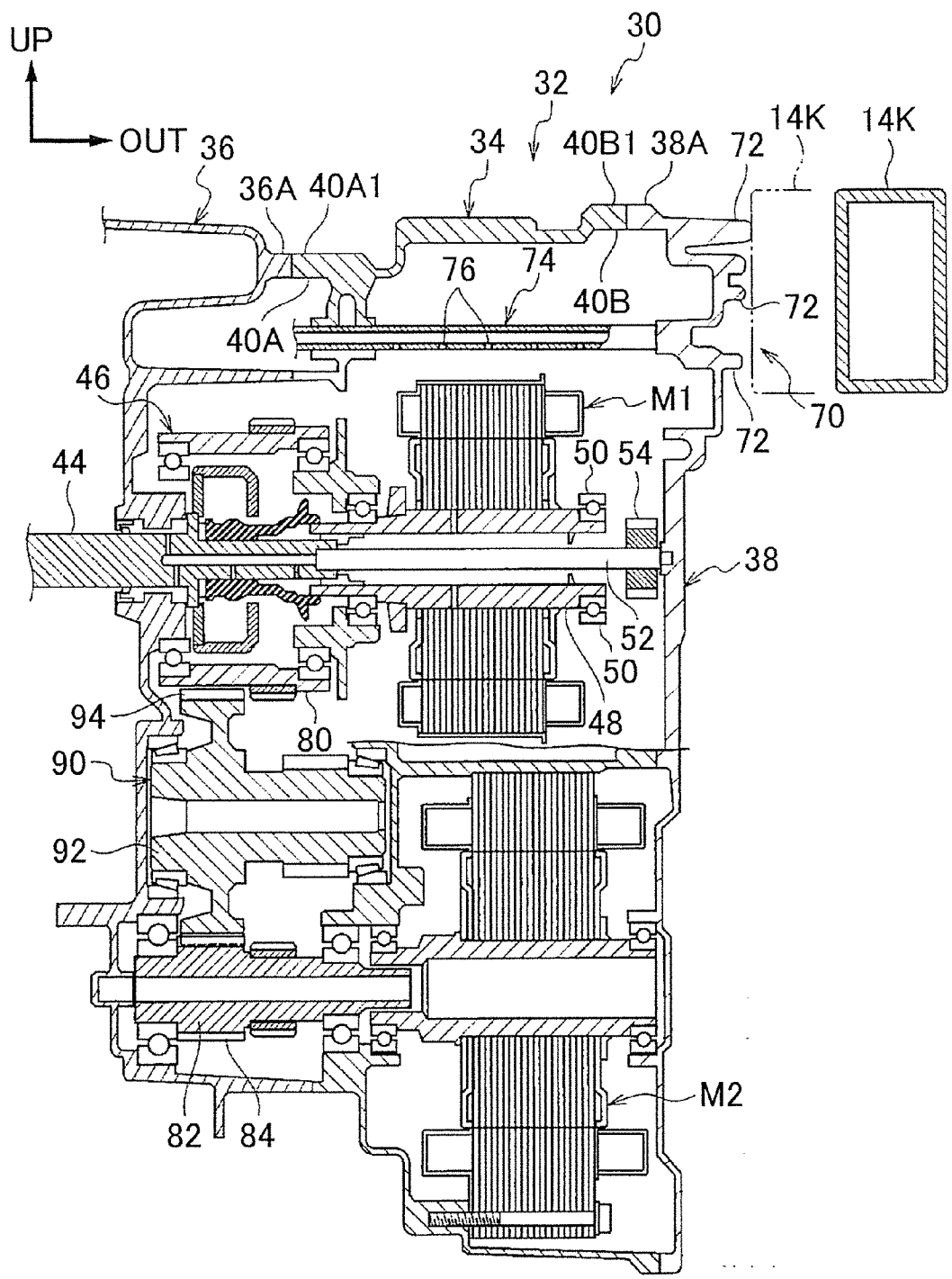

In the second embodiment, as shown in FIG. 3, a top portion of the transaxle unit 30 is arranged inside the bending portion 14K of the front side member 14 in the vehicle width direction. A load receiving portion 70 is provided on the top portion of the transaxle unit 30.

The load receiving portion 70 includes a plurality of projecting portions 72 provided on the side case 38 and a flange portion 38A at the top portion of the side case 38. The projecting portions 72 and the flange portion 38A are located inside the bending portion 14K of the front side member 14 in the vehicle width direction.

The plurality of the projecting portions 72 project outward in the vehicle width direction from the top portion of the side case 38 and the stiffness thereof in the vehicle width direction is intensified compared to other portions of the side case 38. The flange portion 38A is fixed to the flange portion 40B1 at the top portion of the main body case 34 with bolts or the like (not shown) and the stiffness thereof in the vehicle width direction is higher than other portions of the side case 38.

An oil pipe 74 which serves as a shaft portion is arranged inside the plurality of the projecting portions 72 in the vehicle width direction. The oil pipe 74 is arranged inside the main body case 34 and fowled into a cylinder which extends in the vehicle width direction while it incorporates a passage in which oil flows. A plurality of oil discharge holes 76 is formed on the external periphery of the oil pipe 74. An end portion of the oil pipe 74 is brought into contact with the side case 38 and the other end portion thereof is supported by the main body case 34. In the meantime, the end portion of the oil pipe 74 may be arranged in the vicinity of the side case 38 so as to be able to support the side case 38 at the time of small lap collision.

Further, the oil pipe 74 is arranged above the first motor generator M1. An oil hose (not shown) is connected to the oil pipe 74 and oil supplied from the oil hose is dropped to the first motor generator M1 via the oil discharge holes 76.

Next, an operation of the second embodiment will be described.

The transaxle unit 30 is provided with the load receiving portion 70. The load receiving portion 70 includes the plurality of the projecting portions 72 provided on the side case 38 and the flange portion 38A on the top portion of the side case 38, and is located inside the bending portion 14K of the front side member 14 in the vehicle width direction.

Thus, if the bending portion 14K of the front side member 14 is bent inward in the vehicle width direction at the time of small lap collision, the bending portion 14K comes into contact with the plurality of the projecting portions 72. Here, the plurality of the projecting portions 72 project outward in the vehicle width direction from the side case 38 and the stiffness thereof in the vehicle width direction is higher than other portions of the side case 38. As a result, as compared to a case where the bending portion 14K of the front side member 14 comes into contact with other portions of the side case 38, crush-deformation or the like of the side case 38 is suppressed.

Further, the collision load transmitted to the plurality of the projecting portions 72 is transmitted to the flange portion 40B1 of the main body case 34 via the flange portion 38A and at the same time, to the main body case 34 via the oil pipe 74. Therefore, the crush-deformation or like of the side case 38 is further suppressed. As a result, the reaction force R (see FIG. 2) obtained from the power unit 20 at the time of small lap collision increases thereby securing the same effect as the first embodiment. That is, the lateral load which slides the vehicle front part in the direction away from the colliding body can be increased without adding any new member.

In the present embodiment, by using the oil pipe 74 for supplying oil to the first motor generator M1 as the load receiving portion 70, the stiffness of the load receiving portion 70 in the vehicle width direction can be intensified without adding any new member. That is, the lateral load which slides the vehicle front part in the direction away from the colliding body can be increased. Thus, the crush-deformation or the like of the side case 38 is suppressed while suppressing increase in the number of components.

Further, by supporting the top portion of the side case 38 with the oil pipe 74, vibration of the side case 38 accompanied by operation of the second motor generator M2 and the like and generation of sound accompanied by the vibration are reduced. Therefore, any vibration-proof material or sound-proof material can be omitted thereby leading to reduction in cost.

Figure 4:
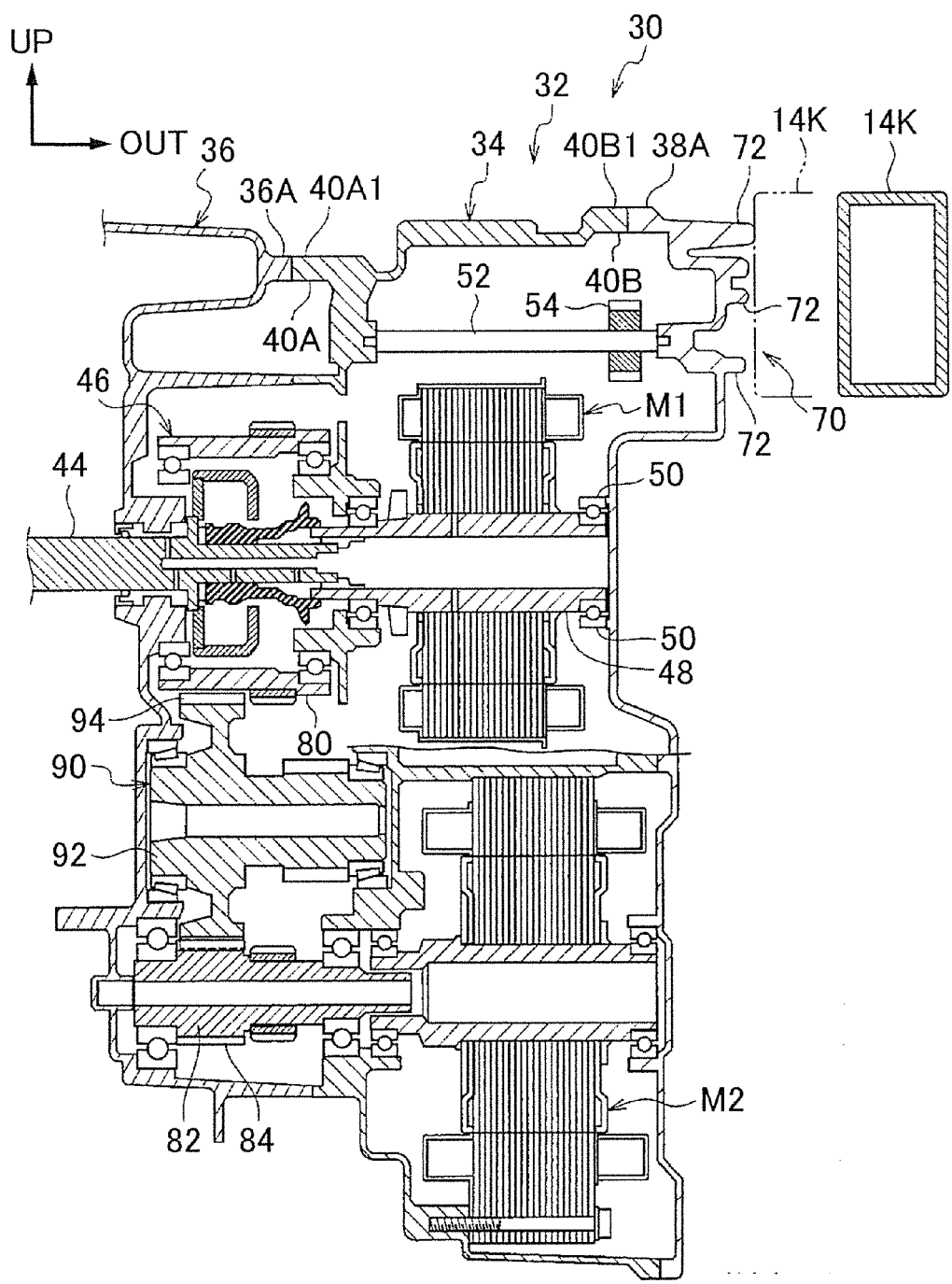

In the meantime, although in the second embodiment, the oil pipe 74 is used as a shaft portion, the present invention is not restricted to this example. For example, as shown in FIG. 4, an oil pump shaft 52 may be used instead of the oil pipe 74. As a consequence, the oil pump shaft 52 inside the hollow shaft 48 becomes unnecessary and thus, the side case 38 can be moved inward in the vehicle width direction. Therefore, the entire length of the transaxle unit 30 in the vehicle width direction can be reduced relative to the position of the input shaft 44.

Next, modifications of the first and second embodiments will be described. In the meantime, although various modifications of the first embodiment will be described below, these modifications can be applied to the second embodiment also appropriately.

Although, in the first embodiment, an example that the projecting portion 60 is provided on the axis of the oil pump shaft 52 and the input shaft 44 has been indicated, the present invention is not restricted to this example. For example, the projecting portion 60 may be provided at a position off the axis of the oil pump shaft 52 and the input shaft 44.

Further, although, in the first embodiment, an example that the projecting portion 60 is used as the load receiving portion has been indicated, the present invention is not restricted to this example. For example, by omitting the projecting portion 60, the oil pump shaft 52 and the input shaft 44 may be used as the load receiving portion. In the second embodiment also, the load receiving portion may be constructed with only the flange portion 38A of the side case 38 or the load receiving portion may be constructed with only the oil pipe 74.

Although in the first embodiment, an example that the side case 38 is provided with the projecting portion 60 has been indicated, the present invention is not restricted to this example. For example, by providing the side case 38 with a reinforcement member such as a reinforcement rib for intensifying the stiffness in the vehicle width direction, a reinforcement portion reinforced by the reinforcement member may be used as the load receiving portion.

Further, although, in the first embodiment, an example that the oil pump shaft 52 and the input shaft 44 are used as the shaft portion has been indicated, the present invention is not restricted to this example. As the shaft portion, it is permissible to use various shafts and pipes within the transaxle unit 30, for example.

Further, although in the first embodiment, an example that the projecting portion 60 is provided on the transaxle unit 30 of the power unit 20 has been indicated, the present invention is not restricted to this example. For example, the projecting portion 60 may be provided on a transmission unit which includes no electric power source such as the second motor generator M2. Further, the load receiving portion may be provided on the other front side members 14 side (right side) of the engine unit 24.

Although in the first embodiment, an example that the projecting portion 60 is provided on a side portion on the one front side member 14 side of the power unit 20 has been indicated, the load projecting portion may be provided on the side portions on both sides of the power unit 20. That is, the load receiving portion may be provided on at least one side portion of the power unit 20. In this case, it is permissible to provide the bending portion 14K on each of a pair of the front side members 14 corresponding to each of the load receiving portions.

Although the embodiments of the present invention have been described above, the present invention is not restricted to those embodiments. The embodiments and various modifications may be combined appropriately and needless to say, the present invention may be executed according to a variety of aspects within a range not departing from the spirit of the present invention.

What is claimed is:

1. A vehicle front structure comprising:
    a power unit provided on a front part of a vehicle;
    a front side member which is arranged outside the power unit in a vehicle width direction and which extends in a vehicle longitudinal direction; and
    a load receiving portion which is provided on a side portion on a front side member side of the power unit and which is located inside the front side member in the vehicle width direction while stiffness thereof in the vehicle width direction is higher than other location of the side portion, wherein
    the power unit contains a transmission unit which is located on the front side member side thereof,
    the transmission unit contains a main body case containing an opening portion outside in the vehicle width direction, and a side case which is fixed to the main body case and which closes the opening portion, the transmission unit contains a shaft portion having an axis which extends in the vehicle width direction, the shaft portion is arranged inside the main body case,
    the load receiving portion is provided on the side case and located on the axis of the shaft portion.

2. The vehicle front structure according to claim 1 wherein
    the shaft portion is a pipe in which oil flows internally.

3. The vehicle front structure according to claim 1 wherein
    the load receiving portion is located forward with respect to a gravity center of the power unit in the vehicle longitudinal direction.

4. The vehicle front structure according to claim 1 wherein
    the front side member contains a bending portion which is to be bent inward in the vehicle width direction due to a load in the vehicle longitudinal direction, and
    the load receiving portion is located inside the bending portion in the vehicle width direction.

* * * * *

UNITED STATES PATENT AND TRADEMARK OFFICE
CERTIFICATE OF CORRECTION

PATENT NO.         : 9,505,444 B2
APPLICATION NO.    : 14/474992
DATED              : November 29, 2016
INVENTOR(S)        : Michitaka Tsuchida et al.

Page 1 of 1

It is certified that error appears in the above-identified patent and that said Letters Patent is hereby corrected as shown below:

In the Claims

In Column 7, Line 13, after "the main body case 34 and" delete "fowled" and insert --formed--, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*